United States Patent [19]

Sato et al.

[11] Patent Number: 4,569,562
[45] Date of Patent: Feb. 11, 1986

[54] METHOD OF AND APPARATUS FOR CONTROLLING A FLUID BEARING

[75] Inventors: Mitsuya Sato, Tokyo; Isamu Shimoda, Zama, both of Japan

[73] Assignee: Canon Kabushiki Kaisha, Tokyo, Japan

[21] Appl. No.: 543,444

[22] Filed: Oct. 19, 1983

[30] Foreign Application Priority Data

Oct. 27, 1982 [JP] Japan ................... 57-189683

[51] Int. Cl.⁴ ............. F16C 29/02; F16C 32/06; F01M 1/00; F16N 17/00
[52] U.S. Cl. ................... 308/5 R; 184/5; 184/6.1; 308/1 A; 384/100
[58] Field of Search .......... 308/1 A, 1 R, 5 R; 384/100, 99, 322, 399; 184/5, 6.1, 6.4, 6

[56] References Cited

U.S. PATENT DOCUMENTS

| | | | |
|---|---|---|---|
| 3,032,142 | 5/1962 | Axer et al. | 184/5 |
| 3,109,514 | 11/1963 | Deflandre | 184/5 |
| 3,674,112 | 7/1972 | Roberts | 184/6.1 |
| 3,724,597 | 4/1973 | Bereit | 308/5 R X |
| 3,812,627 | 5/1974 | Gebel et al. | 308/1 A X |
| 3,856,114 | 12/1974 | Zankl | 184/6.1 |
| 4,209,079 | 6/1980 | Marchal | 184/6.1 |
| 4,272,216 | 6/1981 | Osburn | 308/5 R X |
| 4,326,603 | 4/1982 | Darrow et al. | 308/5 R X |
| 4,351,574 | 9/1982 | Furukawa et al. | 308/5 R X |
| 4,445,168 | 4/1984 | Petryszyn | 184/6.4 X |

FOREIGN PATENT DOCUMENTS 840751  7/1960  United Kingdom ............ 184/5

Primary Examiner—Stuart S. Levy
Assistant Examiner—Thomas R. Hannon
Attorney, Agent, or Firm—Fitzpatrick, Cella, Harper & Scinto

[57] ABSTRACT

In a method of and an apparatus for controlling a fluid bearing, a state in which the power source of a control system is switched off (an open state) or a state in which a predetermined pressure different from the OFF condition is provided (a stopped state) is established when an abnormal condition in which the pressure reaches a predetermined value exceeding a servo-controlled upper or lower limit occurs, whereby the pressure of the fluid bearing is held within a safe pressure range.

6 Claims, 5 Drawing Figures

METHOD OF AND APPARATUS FOR CONTROLLING A FLUID BEARING

BACKGROUND OF THE INVENTION

1. Field of the Invention

This invention relates to a method of and an apparatus for controlling a fluid bearing for effecting pressure control. More particularly, it relates to a control method and control apparatus which detect trouble in a control section or abnormality in the load and prevent abnormal nearing of the immovable portion and movable portion of the fluid bearing.

2. Description of the Prior Art

When the pressure of a fluid bearing is to be controlled, there is a danger of the immovable portion and the movable portion of the fluid bearing coming into contact with each other due to trouble in the control section or momentary fluctuation of the load. If the immovable portion and movable portion come into contact with each other during the operation of the fluid bearing, it will impart a great damage to the mechanical system of the fluid bearing.

SUMMARY OF THE INVENTION

It is an object of the present invention to always detect the state of a fluid bearing and avoid contact between the immovable portion and movable portion of the fluid bearing.

To achieve such object, in the present invention, the upper limit and lower limit of pressure are determined and servo control of the fluid bearing is effected within that range and in the vicinity thereof, while, on the other hand, the control system is brought into an open or stopped state during an abnormal condition in which the pressure reaches a predetermined value exceeding the upper limit or the lower limit, thereby holding the pressure within a safe pressure range.

The said abnormal condition is detected by a pressure switch or a nearing switch.

The invention will become more fully apparent from the following detailed description thereof taken in conjunction with the accompanying drawings.

DESCRIPTION OF THE PREFERRED EMBODIMENT

Figure 1:
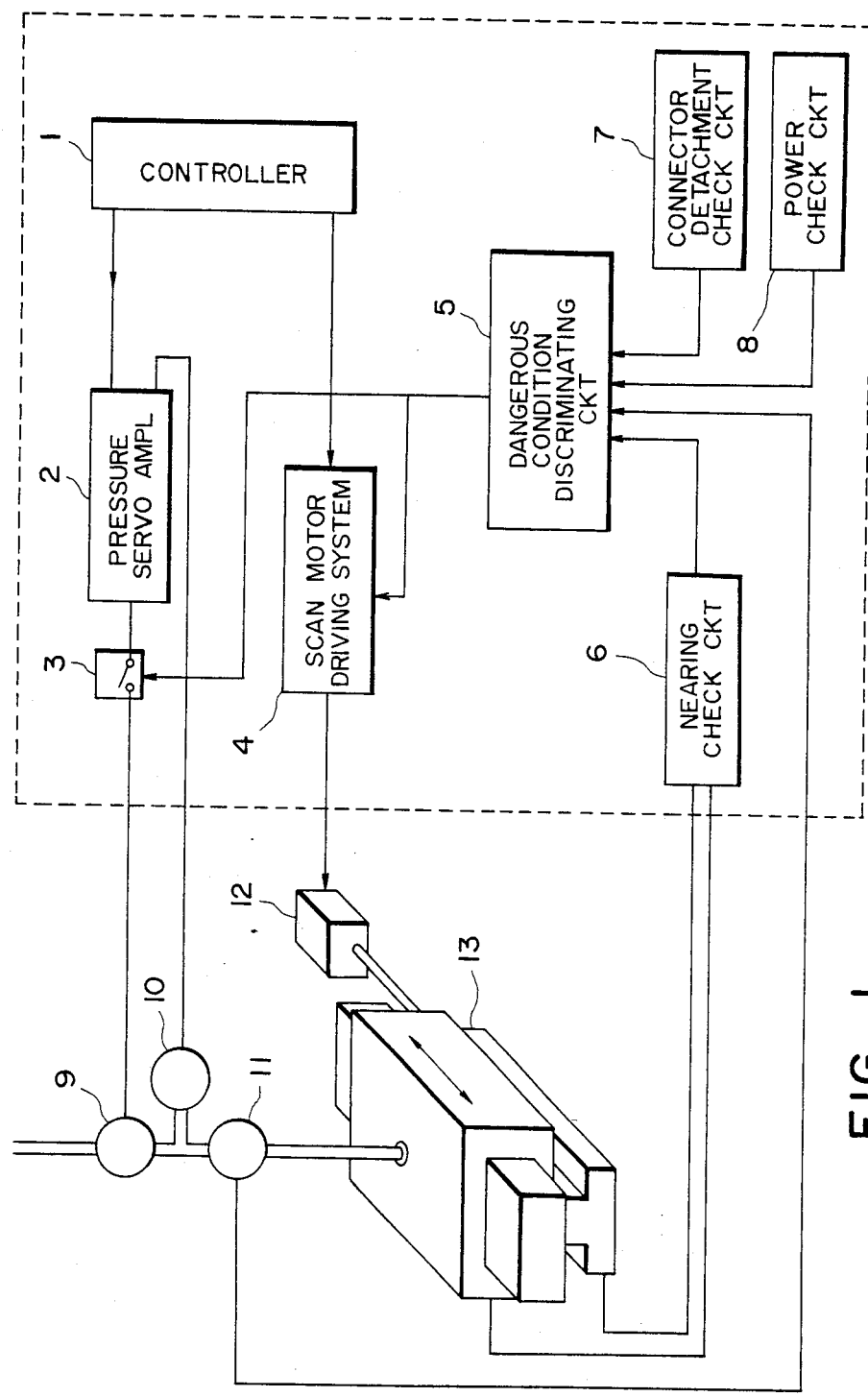
FIG. 1 shows the entirety of a system according to the present invention.

FIG. 1 shows the entire construction of the pressure control system according to the present invention. From a controller 1, a designated speed value is put out to a scan motor driving system 4 and a designated pressure value is put out to a pressure servo amplifier 2. The scan motor driving system 4 moves a motor 12. Thus, the movable portion of a linear air bearing 13 can move in the direction of the arrow. The pressure servo amplifier 2 drives a servo valve 9 by a pressure sensor 10 so that the actual pressure is coincident with the designated pressure value from the controller 1.

What has been described above is the normal operation, but when the actual pressure deviates from the designated pressure value and exceeds the upper or lower control limit value, the upper and lower limit functions of the pressure servo amplifier 2 operate to thereby return the actual pressure to a value within the upper and lower limits.

If the actual pressure does not return to a value within the upper and lower limits even by the above-described operation and the pressure further decreases or increases, it is detected by a pressure switch 11. Upon an abnormal pressure detection by the pressure switch 11, detection of the abnormal nearing of the movable portion and immovable portion of the air bearing by a nearing check circuit 6, detection of the detachment of the connector in the control system by a connector detachment check circuit 7 or detection of the reduction of the power source in the control system by a power source check circuit 8 is effected, there is transmitted to a dangerous condition discriminating circuit 5 the information that the control system is in an abnormal condition. The dangerous condition discriminating circuit 5, when it receives one or more signals indicative of the abnormal condition from the aforementioned detecting system, judges that it is unsuitable to continue the control, and puts out a stop signal to the scan motor driving system 4 and at the same time, deenergizes a relay 3, thereby disconnecting the servo valve 9 from the control system. By the servo valve 9 being disconnected from the control system, a secondary pressure lower than a primary pressure, namely, the pressure of the linear air bearing portion, is provided. The fluid system effects the selection of the servo valve and the determination of the primary pressure so that the secondary pressure is within a safe pressure range to the linear air bearing.

Figure 2:
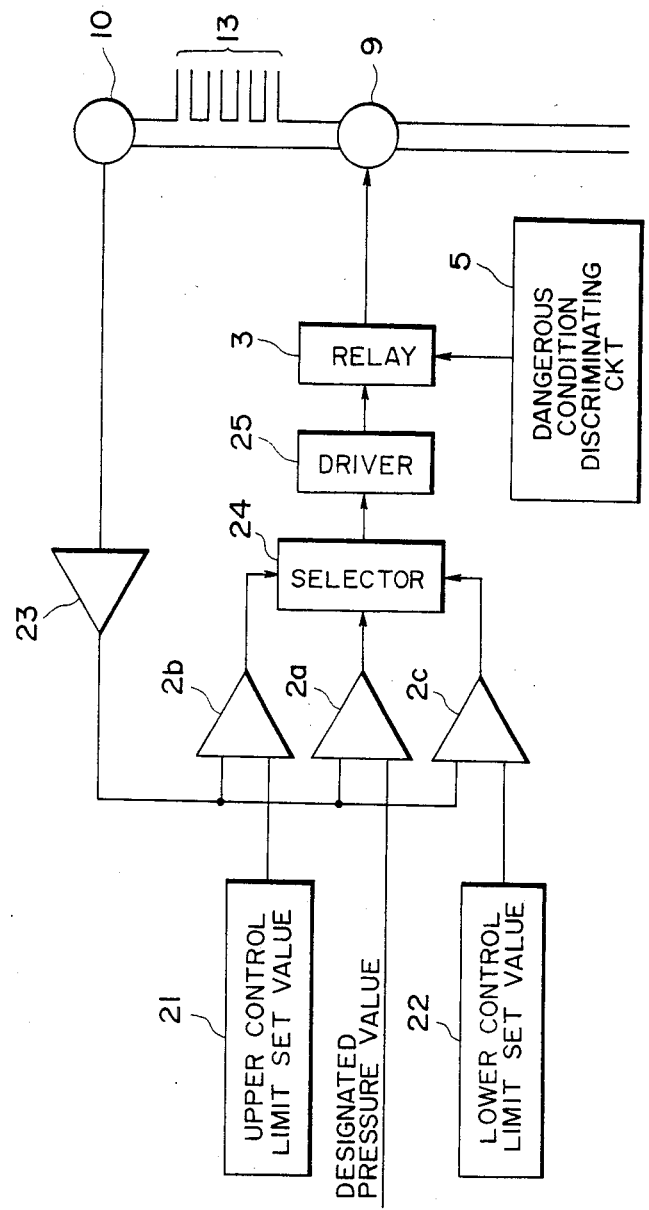
FIG. 2 is a detailed diagram of a pressure servo amplifier.

The details of the pressure servo amplifier 2 are shown in FIG. 2.

In FIG. 2, reference numeral 21 designates an upper control limit set value for determining the controllable upper limit pressure, reference numeral 22 denotes a lower control limit set value for determining the controllable lower limit pressure, reference character 2b designates a servo amplifier of great gain for forcibly reducing the pressure to the upper control limit set value 21 when the actual pressure exceeds this limit pressure value, reference character 2c denotes a servo amplifier of great gain for forcibly increasing the pressure to the lower control limit set value 22 when the actual pressure is below this limit pressure value, reference character 2a designates a servo amplifier which works when the actual pressure is within the upper and lower control limits, reference numeral 23 denotes an amplifier for amplifying the pressure sensor output, reference numeral 24 designates a selector for selecting one of the outputs of the servo amplifiers 2a, 2b and 2c, and reference numeral 25 denotes a driver for driving the servo valve 9. Reference numeral 3 designates the relay for disconnecting the servo valve from the dangerous condition control system 5 as previously described, reference numeral 9 denotes the servo valve, and reference numeral 10 designates the pressure sensor.

When the actual pressure is within the upper and lower control limits, the servo amplifier output 2a provides the selector output. When the actual pressure is above the upper control limit, the upper limit servo amplifier output 2b provides the selector output. When the actual pressure is below the lower control limit, the lower limit servo amplifier output 2c provides the selector output.

Thus, when the actual pressure is outside the upper and lower control limits, change-over occurs from the normally used servo amplifier 2a to the servo amplifiers 2b and 2c of greater servo gain, that is, capable of effective stronger drive, whereby the actual pressure can be more quickly driven into the upper and lower control limits.

Figure 3:
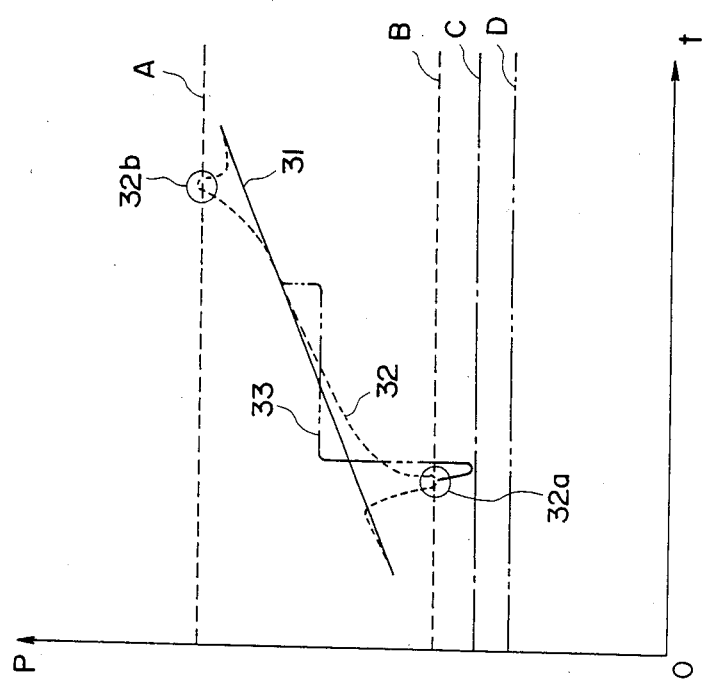
FIG. 3 is a graph showing the operating pressure of each sensor and the actual variation in pressure.

The control operation of the present invention will now be described by reference to FIG. 3. The control limit and the operating pressures of the pressure switch and the nearing switch are indicated by broken line, dot-and-dash line and dots-and-dash line, respectively. In FIG. 3, the abscissa represents time t and the ordinate represents pressure P. Here, A shows the upper control limit set value, B the lower control limit set value, C the pressure switch operating pressure value and D the nearing switch operating pressure value. The air bearing is moved so as to follow a preset designated pressure line 31, but when the actual pressure curve varies as indicated by 32 due to various factors and is below the lower control limit set value B at 32a and above the upper control limit set value A at 32b, abnormal nearing occurs. As a first safety mechanism, if the amount exceeding the lower limit or the upper limit is slight as seen at 32a or 32b, the control system is returned by the lower limit servo amplifier so as to follow the designated pressure line 31. However, when the actual pressure falls greatly below the lower limit set value B, to the pressure switch operating pressure value C, then as a second safety mechanism, the control system changes over to an open state or a stopped state and as shown by curve 33, it holds the pressure within a safe pressure range until the trouble is remedied, thus avoiding abnormal nearing. The open state refers to a state in which the power source of the control system has been returned to its OFF condition, and the stopped state refers to a state in which the control system has been changed over to hold a predetermined safe pressure different from the OFF condition.

Figure 4:
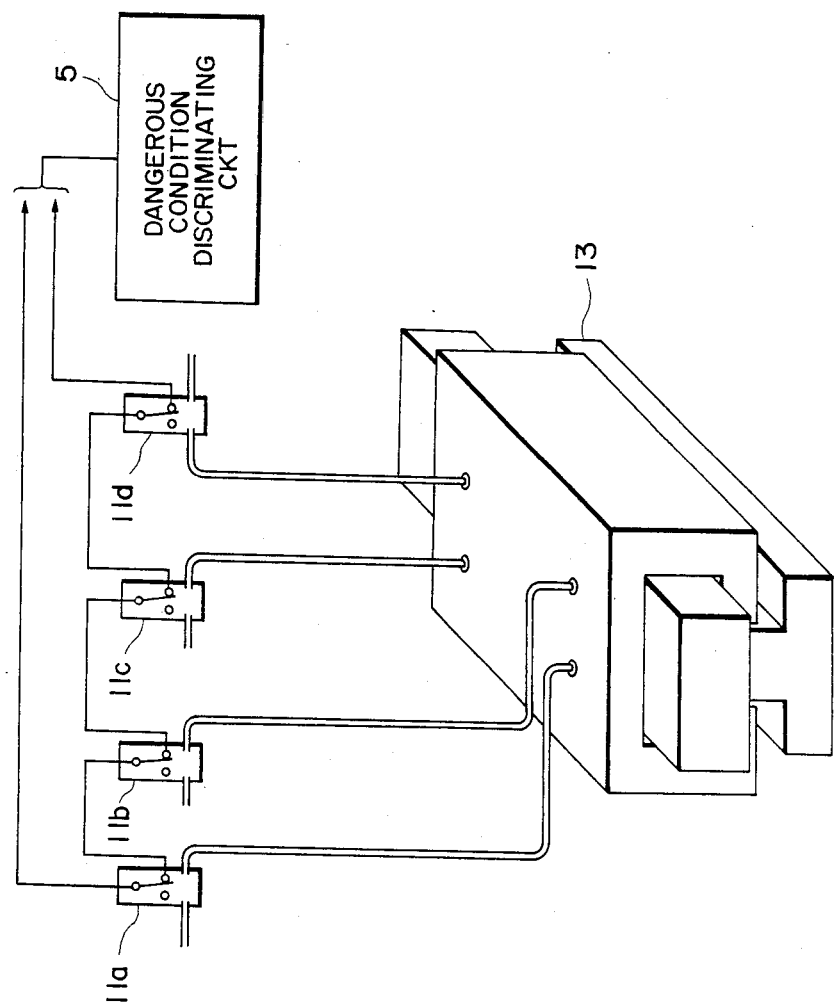
FIG. 4 illustrates a pressure switch.

FIG. 4 illustrates the pressure switches.

Designated by 11a-11d are pressure switches for detecting the pressures of the air discharge ports of the linear air bearing 13. These pressure switches are adapted to be opened when the pressure switch operating pressure value C of FIG. 3 is reached, and if even one of the air discharge ports assumes such condition, the pressure switches transmit that information to the dangerous condition discriminating circuit 5 to thereby hold the pressure within a safe pressure range.

It should be noted that the pressure switch operating pressure value C may of course be set to a value below the lower control limit set value B as well as a value above the upper control limit set value A.

Figure 5:
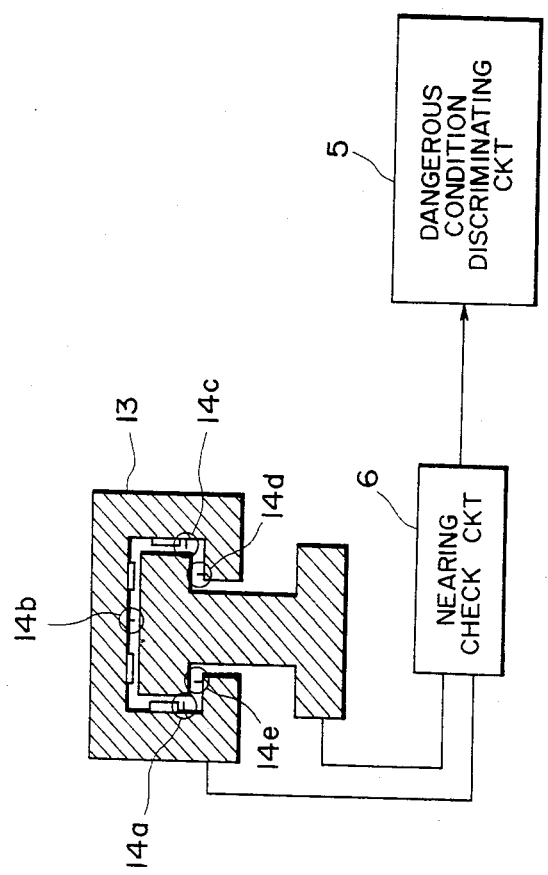
FIG. 5 illustrates a nearing switch.

FIG. 5 illustrates the nearing switches.

Reference numerals 14a-14e designate nearing check switches attached to the movable portion of the linear air bearing, and reference numeral 6 denotes a nearing check circuit which receives the signals from the nearing switches. A nearing check terminal is an electrical conductor, through which the immovable portion and movable portion of the linear air bearing are rendered electrically conductive, whereby abnormal nearing of the immovable portion and movable portion can be detected.

Each nearing switch is of such a structure that does not impart damage to the immovable portion of the linear air bearing even when the immovable portion and movable portion of the linear air bearing have completely come into contact with each other. The maintenance of the safe pressure by the nearing switches is similar to that by the pressure switches.

The nearing switches are not restricted to ones which detect contact between the immovable portion and movable portion of the fluid bearing, but may be ones which detect that the spacing between the immovable portion and the movable portion becomes close to a predetermined range.

That is, the nearing switches may be ones which directly detect the nearing of the immovable portion and movable portion of the fluid bearing by a non-contact sensor such as a gap measuring device using an eddy current, instead of indirectly detecting said nearing.

If the nearing switches and the pressure switches are used jointly, the safety of the fluid bearing will be improved.

Of course, when a dangerous condition has been detected, it is also possible to ensure the extrication from the dangerous condition more quickly not only by discontinuing the control (that is, establishing the open state) as previously described, but also by connecting the fluid bearing to another high pressure fluid system which will render the fluid bearing safe (that is, establishing the stopped state).

The effects of the present invention may be summarized as follows:

(1) Forcible extrication from the dangerous area is effected by continuing the control. That is, when the pressure of the fluid bearing is above a predetermined upper pressure limit or below a predetermined lower pressure limit due to a fluctuation of the load or a fluctuation of the fluid pressure of the pressure source, forcible extrication therefrom is effected by a quickly responsive exclusive servo system. By this, it is possible not only to secure the safety of the fluid bearing but also to continue the control.

(2) The safety of the fluid bearing is secured by discontinuing the control. That is, in the method described in item (1) above, the control is discontinued when the pressure of the fluid bearing is not within the upper and lower limits or when trouble in the control system is detected. At this time, the pressure of the fluid bearing is adapted to be a safe pressure. At the same time, the driving of the fluid bearing is usually discontinued. By this, even in the event of trouble in the control system of the fluid bearing, it is possible to prevent damage to the mechanical system of the fluid bearing.

We claim:

1. A method of controlling a fluid bearing, comprising the steps of:
determining upper and lower limits of pressure and servo-controlling the pressure of the fluid bearing within a predetermined range which includes the range between said upper and lower limits; and
shifting the pressure toward and holding the pressure within a safe pressure range substantially identical to said range between said upper and lower limits, responsive to an occurrence of, an abnormal condition in which the pressure reaches a predetermined value outside of said predetermined range.

2. A method according to claim 1, wherein, responsive to occurrence of said abnormal condition, a control system is switched off to shift the pressure toward and hold the pressure within said safe pressure range.

3. A method according to claim 1, wherein, responsive to occurrence of said abnormal condition, a control system is switched off and the pressure at the time of said switching-off is shifted toward said safe pressure range.

4. An apparatus for controlling a fluid bearing, comprising:

means for determining upper and lower limits of pressure and servo-controlling the pressure of the fluid bearing within a predetermined range including the range between the upper and the lower limits;

a pressure switch, said switch being operated responsive to an occurrence of an abnormal condition in which the pressure reaches a predetermined value outside of the predetermined range; and means for holding the pressure within a safe pressure range substantially identical to the range between the upper and the lower limits, in response to the operation of said pressure switch.

5. An apparatus for controlling a fluid bearing, comprising:

means for determining upper and lower limits of pressure and servo-controlling the pressure of the fluid bearing within a predetermined range including the range between the upper and the lower limits;

a nearing switch, said switch being operated responsive to an occurrence of an abnormal condition in which a movable portion of the fluid bearing and an immovable portion of the fluid bearing near each other within a predetermined zone; and means for holding the pressure within a safe pressure range substantially identical to the predetermined range in response to the operation of said nearing switch.

6. An apparatus for controlling a fluid bearing, comprising:

means for determining upper and lower limits of pressure and servo-controlling the pressure of the fluid bearing within a predetermined range including the range between the upper and the lower limits;

a pressure switch, said pressure switch being operated responsive to an occurrence of an abnormal condition in which the pressure reaches a predetermined value outside of the predetermined range;

a nearing switch, said nearing switch being operated responsive to an occurrence of an abnormal condition in which a movable portion of the fluid bearing and an immovable portion of the third bearing near each other within a predetermined zone; and means for holding the pressure within a safe pressure range substantially identical to said predetermined range, in response to the operation of at least one of said switches.

* * * * *

UNITED STATES PATENT AND TRADEMARK OFFICE
CERTIFICATE OF CORRECTION

PATENT NO. : 4,569,562

DATED : February 11, 1986

INVENTOR(S) : Mitsuya Sato et al.

It is certified that error appears in the above-identified patent and that said Letters Patent is hereby corrected as shown below:

Col. 6, line 23, change "third bearing" to --fluid bearing--.

Signed and Sealed this

Twenty-fifth Day of November, 1986

*Attest:*

DONALD J. QUIGG

*Attesting Officer*  *Commissioner of Patents and Trademarks*